US012680965B2

(12) United States Patent
Taguchi et al.

(10) Patent No.: US 12,680,965 B2
(45) Date of Patent: Jul. 14, 2026

(54) ATTENUATING AN INSPECTION DEVICE THAT INSPECTS TRANSPARENT OR TRANSLUCENT CYLINDRICAL BODY

(71) Applicant: CKD CORPORATION, Aichi (JP)

(72) Inventors: Yukihiro Taguchi, Aichi (JP); Shozo Oda, Aichi (JP); Shiori Imaizumi, Aichi (JP)

(73) Assignee: CKD Corporation, Aichi (JP)

( * ) Notice: Subject to any disclaimer, the term of this patent is extended or adjusted under 35 U.S.C. 154(b) by 147 days.

(21) Appl. No.: 18/748,379

(22) Filed: Jun. 20, 2024

(65) Prior Publication Data

US 2024/0337609 A1    Oct. 10, 2024

Related U.S. Application Data

(63) Continuation of application No. PCT/JP2022/033216, filed on Sep. 5, 2022.

(30) Foreign Application Priority Data

Jan. 13, 2022    (JP) ................................. 2022-003898

(51) Int. Cl.
G01N 21/958      (2006.01)
G01N 21/952      (2006.01)
G06T 7/00        (2017.01)

(52) U.S. Cl.
CPC ......... G01N 21/958 (2013.01); G01N 21/952 (2013.01); G06T 7/0002 (2013.01); G01N 2201/02 (2013.01); G01N 2201/08 (2013.01)

(58) Field of Classification Search
CPC .............. G01N 21/958; G01N 21/952; G01N 2201/02; G01N 2201/08; G01N 21/896;
(Continued)

(56) References Cited

U.S. PATENT DOCUMENTS 3,942,897 A * 3/1976 Takahashi ........... D06M 15/592
                                                    356/427
8,036,444 B2 * 10/2011 Nielsen .............. G01N 21/9027
                                                    382/142

FOREIGN PATENT DOCUMENTS

JP          S63-1958 A     1/1988
JP          H06-174949 A   6/1994
(Continued)

OTHER PUBLICATIONS

International Search Report issued in corresponding International Application No. PCT/JP2022/033216 mailed Oct. 18, 2022 (5 pages).

(Continued)

*Primary Examiner* — Hwa Andrew Lee
(74) *Attorney, Agent, or Firm* — Osha Bergman Watanabe & Burton LLP

(57)                ABSTRACT

An inspection device includes: an illumination device that irradiates the inspection object with light; a rotation unit that rotates the inspection object; a fiber optical plate that holds optical fibers in parallel and has a light incident surface and a light emission surface at which outlets of the optical fibers are disposed; an imaging unit that includes sensor elements arranged in a row and respectively corresponding to the outlets, and takes an image of the inspection object; a control device that determines whether a quality of the inspection object is good or poor based on the image; and an oblique ray attenuation body that is disposed between the light emission surface and the imaging unit, and includes attenuation function elements arrayed in parallel and each having a straight cylindrical shape that surrounds an optical path between each of the outlets and each of the sensor elements.

6 Claims, 7 Drawing Sheets

(58) Field of Classification Search
     CPC ..... G01N 21/90; G06T 7/0002; G06T 7/0004;
                    G01V 1/181; G01V 1/20; G01P 15/125
     See application file for complete search history.

(56)                References Cited

FOREIGN PATENT DOCUMENTS

| JP | 2000-138792 A | 5/2000 |
|----|---------------|--------|
| JP | 2001-159716 A | 6/2001 |
| JP | 2007-93428 A | 4/2007 |
| JP | 2010-271131 A | 12/2010 |
| JP | 2018-128554 A | 8/2018 |

OTHER PUBLICATIONS

Written Opinion issued in corresponding International Application
No. PCT/JP2022/033216 mailed Oct. 18, 2022 (4 pages).
International Preliminary Report on Patentability issued in corre-
sponding International Application No. PCT/JP2022/033216, dated
Jun. 20, 2024, with translation (10 pages).

\* cited by examiner

FIG. 8

ATTENUATING AN INSPECTION DEVICE THAT INSPECTS TRANSPARENT OR TRANSLUCENT CYLINDRICAL BODY

BACKGROUND

Technical Field

The present disclosure relates to an inspection device configured to perform an inspection for a cylindrical transparent body.

Description of Related Art

Containers, lamps and the like having a cylindrical transparent body made of transparent or translucent glass have been known conventionally. For example, a liquid such as a cosmetic product or the like or a component of the lamp may be placed in the transparent body. A printed portion consisting of letters, characters, signs, symbols and the like indicating various pieces of information, such as a product name, a product number, a model number and the like may be formed on a side wall portion of the transparent body.

A known configuration of an inspection device used to perform an inspection for the transparent body as described above includes a fiber optical plate configured to enable light entering a light incident surface thereof to be transmitted to a light emission surface thereof and to cause an optical image of the transparent body that is an object to be inspected (hereinafter referred to as "inspection object") to be projected on this light emission surface; and an imaging unit configured to perform imaging of an optical image of the inspection object projected on the light emission surface (as described in, for example, Patent Literature 1). This device alternately repeats rotating the inspection object by a predetermined angle and imaging an optical image of the inspection object and performs an inspection, based on an image obtained by such alternate repetition. This device accordingly allows for an inspection for the whole circumference of a side wall portion of the inspection object.

PATENT LITERATURE

Patent Literature 1: Japanese Patent No. 2010-271131A

The device described in Patent Literature 1 mentioned above performs imaging of an optical image in the state that the light incident surface of the fiber optical plate and the inspection object are made close to each other to be substantially brought into contact with each other, with a view to focusing the optical image. It is thus required to cause the shape of the light incident surface of the fiber optical plate, which is located on the inspection object-side, to substantially match with the shape of the side wall portion of the inspection object. Accordingly, there is a need to provide a plurality of different fiber optical plates for respective different inspection objects. In the case of a change of the inspection object, there is also a need to replace the fiber optical plate corresponding to the inspection object that is changed. This is likely to increase the cost of the inspection.

In order to rotate the inspection object, there is also a need to once separate the inspection object and the fiber optical plate from each other. For an inspection of the whole circumference of the side wall portion of the inspection object, it is accordingly required to repeat a series of processes of separating the inspection object and the fiber optical plate from each other, rotating the inspection object by a predetermined angle, subsequently making the inspection object and the fiber optical plate close to each other again, and performing imaging of an optical image. This makes it difficult to increase the speed of the inspection.

SUMMARY

By taking into account the circumstances described above, one or more embodiments of the present disclosure provide an inspection device configured to reduce the cost of an inspection and to increase the speed of the inspection.

The following describes each of various aspects of the present disclosure. Functions and advantageous effects that are characteristic of each of the aspects are also described as appropriate.

Aspect 1. There is provided an inspection device that inspects a transparent or translucent cylindrical body as an inspection object. The inspection device comprises an illumination device that irradiates the inspection object with predetermined light; a rotation unit (or a rotation device) that rotates the inspection object about a predetermined rotation axis; a fiber optical plate that: holds a plurality of optical fibers arrayed in parallel along a direction of the rotation axis, and has a light incident surface facing the inspection object, and a light emission surface opposite to the light incident surface, wherein light rays from the inspection object enter the light incident surface, pass through the optical fibers to reach the light emission surface, and are output from a plurality of outlets of the optical fibers disposed at the light emission surface; an imaging unit (or an imaging device) that: comprises a plurality of sensor elements that are arranged in a row and respectively correspond to the outlets, takes an image of the inspection object by receiving with the sensor elements the light rays transmitted through the fiber optical plate; a control device (or a determination unit) that determines whether a quality of the inspection object is good or poor based on an image obtained by the imaging unit; and an oblique ray attenuation body (or an oblique ray attenuation unit) that: is disposed between the light emission surface and the imaging unit, and comprises a plurality of attenuation function elements arrayed in parallel and each having a straight cylindrical shape that surrounds an optical path between each of the outlets and each of the sensor elements corresponding to the outlet, wherein the attenuation function elements attenuate, out of the light rays output from the light emission surface, oblique rays that are inclined with respect to an extending direction of the attenuation function elements.

In the configuration of Aspect 1 described above, the attenuation function elements of the oblique ray attenuation unit serve to attenuate the oblique rays that are inclined with respect to the extending direction of the attenuation function elements, out of the light rays emitted from the light emission surface of the fiber optical plate. This configuration enables only the light rays entering from a specific direction to readily reach the sensor elements, even in a state that a clearance is made between the inspection object and the fiber optical plate, such as to allow the light rays from the inspection object-side to readily enter from a variety of directions to the light incident surface of the fiber optical plate. This prevents a reduction in the depth of field caused by the effects of the oblique rays (a reduction in a distance range between the inspection object and the fiber optical plate that enables a focused image to be obtained) and extends the depth of field. This configuration thus enables a focused image to be obtained more reliably even in the case of imaging the inspection object in the state that a clearance is made between the inspection object and the fiber optical plate. There is accordingly no need to separate the inspection object and the fiber optical plate from each other and make the inspection object and the fiber optical plate close to each other again, in the process of rotating and imaging the inspection object. The configuration thus allows for rotation and imaging of the inspection object in the state that the inspection object and the fiber optical plate are kept separate from each other. This increases the speed of the inspection with assuring the high accuracy of the inspection.

Furthermore, this configuration enables a clearance to be made between the inspection object and the fiber optical plate, so that there is no need that the surface of the fiber optical plate (the light incident surface) located on the inspection object-side has a shape that roughly matches with the shape of a side wall portion of the inspection object. There is accordingly no need to provide a plurality of different fiber optical plates for respective different inspection objects or to replace the fiber optical plate with a change of the inspection object. This reduces the cost required for the inspection.

Aspect 2. In the inspection device described in above Aspect 1, the light incident surface and the light emission surface may be flat surfaces orthogonal to a side face of the fiber optical plate located between the light incident surface and the light emission surface.

The configuration of above Aspect 2 enables the emission angles of the light rays emitted from the light emission surface to be identical with the incident angles of the light rays entering the light incident surface. This configuration enables the light rays that are transmitted through or reflected from a location of the inspection object located in front of the light incident surface, that orthogonally enter the light incident surface, and that are emitted from the light emission surface in a direction perpendicular to the light emission surface, to readily reach the sensor elements. This configuration, on the other hand, makes it difficult for the light rays obliquely entering the light incident surface (i.e., the oblique rays) to reach the sensor elements. This enables an image of the inspection object suitable for the inspection to be obtained more reliably and further enhances the inspection accuracy.

Aspect 3. The inspection device described in either above Aspect 1 or above Aspect 2 may further comprise a distance adjustment unit that moves at least one of the inspection object and the fiber optical plate, and adjusts a distance between the inspection object and the light incident surface of the fiber optical plate.

The configuration of above Aspect 3 facilitates handling of a variety of inspection objects having different shapes and enhances the convenience of the inspection.

Aspect 4. The inspection device described in any one of above Aspects 1 to 3 may further comprise an attenuation regulator (or an attenuation regulating unit) that regulates a degree of attenuation of the oblique rays by the attenuation function elements.

In the configuration of above Aspect 4, the attenuation regulating unit serves to regulate the degree of attenuation of the oblique rays by the attenuation function elements. The regulation of the degree of attenuation allows for adjustment of the depth of field. This configuration accordingly assures the appropriate inspection (with the high inspection accuracy) for inspection objects having a variety of different shapes, for example, an inspection object having a concave-convex surface or an inspection object in a shape other than a cylindrical shape (for example, in an elliptic columnar shape or in a polygonal columnar shape).

Aspect 5. In the inspection device described in above Aspect 4, the attenuation regulating unit may be implemented by a function of making the attenuation function elements extensible along a direction of an axis thereof.

The configuration of above Aspect 5 enables the degree of attenuation of the oblique rays to be regulated by extension and contraction of the attenuation function element. This accordingly enables the attenuation regulating unit to be implemented by a relatively simple configuration and reduces an increase in the cost relating to manufacture of the device and the like.

Aspect 6. The inspection device described in any one of above Aspects 1 to 5 may further comprise a distance keeping unit that keeps constant a distance between a part of the inspection object that is an imaging object by the imaging unit and the light incident surface of the fiber optical plate by moving at least one of the inspection object and the fiber optical plate with rotation of the inspection object by the rotation unit.

The configuration of above Aspect 6 enables the distance between the inspection object (more specifically, a location thereof as an imaging object) and the light incident surface of the fiber optical plate to be kept constant, while rotating the inspection object. Accordingly, this configuration enables a focused image to be obtained more reliably even when the inspection object has a variety of different shapes. This assures the more appropriate inspection (with the higher inspection accuracy) for the inspection objects having a variety of different shapes.

BRIEF DESCRIPTION OF DRAWINGS

FIG. 8 is a schematic view illustrating a distance keeping mechanism according to one or more embodiments;

DETAILED DESCRIPTION OF EMBODIMENTS

Figure 2:
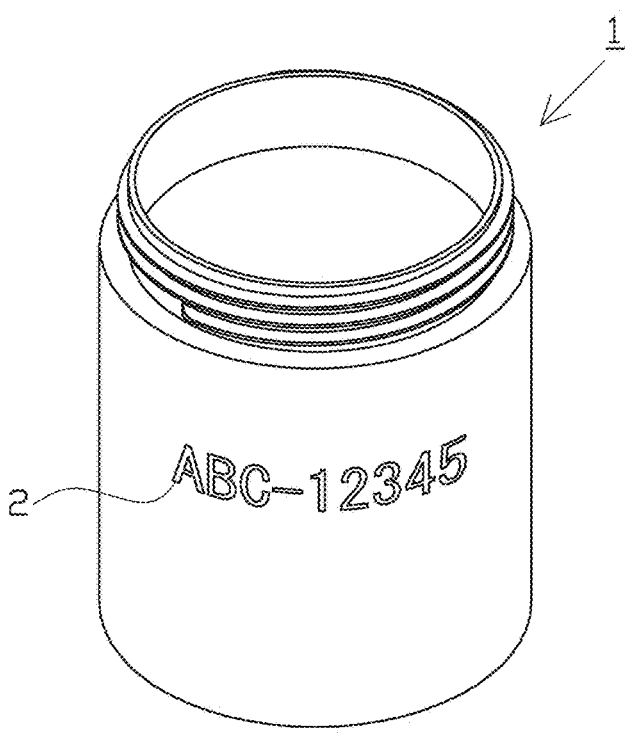
FIG. 2 is a schematic perspective view illustrating a transparent body as an inspection object.

The following describes embodiments with reference to drawings. FIG. 2 is a diagram illustrating a transparent body 1 as an inspection object.

The transparent body 1 is made of colorless transparent glass, resin or the like and is in a cylindrical shape. The transparent body 1 may, however, be translucent. The transparent body 1 has a printed portion 2 that is formed on a surface thereof and that displays information such as a product number (for example, "ABC-12345"). The contents of the information displayed by the printed portion 2 are not specifically limited. According to one or more embodiments, a location where at least the printed portion 2 is formed, in the transparent body 1 has a cylindrical shape.

Figure 1:
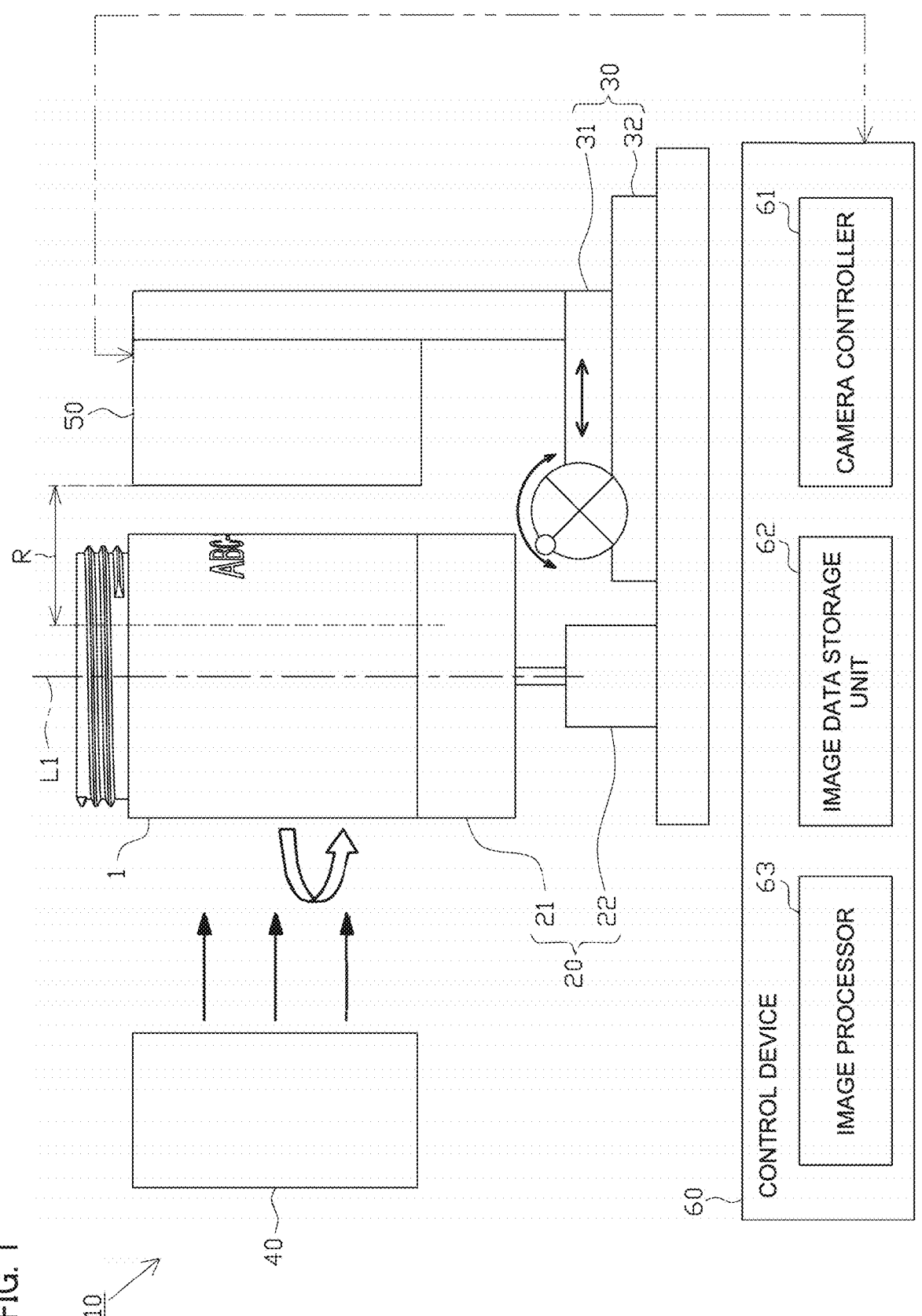
FIG. 1 is a schematic configuration diagram illustrating an inspection device.

The following describes an inspection device configured to perform an inspection for the transparent body 1 described above. FIG. 1 is a schematic configuration diagram illustrating an inspection device 10.

The inspection device 10 includes a rotation mechanism 20, a distance adjustment mechanism (or distance adjustment mechanism unit) 30, an illumination device 40, an imaging unit (or imaging device) 50 and a control device 60. According to one or more embodiments, the rotation mechanism 20 configures the "rotation unit (or rotation device)", and the "distance adjustment mechanism 30 configures the "distance adjustment unit".

The rotation mechanism 20 is a mechanism configured to rotate the transparent body 1 that is the inspection object. The rotation mechanism 20 includes a rotating table 21 and a motor 22.

The rotating table 21 is a table which the transparent body 1 as the inspection object is placed on, and is configured to be rotatable about a predetermined rotation axis L1. According to one or more embodiments, at the time of an inspection, the transparent body 1 is placed on the rotating table 21 in such a state that a center axis of the transparent body 1 is aligned with the rotation axis L1. A holder unit (not shown) may be provided to control the relative rotation and the relative motion of the transparent body 1 placed on the rotating table 21 relative to the rotating table.

The motor 22 is a driving device configured to rotate the rotating table 21. Rotating the rotating table 21 by the motor 22 causes the transparent body 1 placed on the rotating table 21 to rotate about the rotation axis L1.

The distance adjustment mechanism 30 is a mechanism configured to adjust the distance between the transparent body 1 as the inspection object and a light incident surface 51*a* of a fiber optical plate (hereinafter abbreviated as "FOP") 51 described later in the imaging unit 50. The distance adjustment mechanism 30 includes a holding base 31 and a rail 32.

The holding base 31 is configured to hold the imaging unit 50 at a position on a lateral side of the transparent body 1 as the inspection object and is placed on the rail 32 in such a state as to be slidably movable along a longitudinal direction of the rail 32. The rail 32 is extended in a direction perpendicular to the rotation axis L1. The distance between the transparent body 1 placed on the rotating table 21 and the light incident surface 51*a* of the FOP 51 is adjustable by sliding and moving the holding base 31 along the longitudinal direction of the rail 32 to adjust the distance between the rotating table 21 and the imaging unit 50. The distance adjustment mechanism 30 is provided with a regulating unit (not shown) configured to allow for or prohibit the sliding and moving of the holding base 31. This regulating unit enables the holding base 31 and thereby the imaging unit 50 to be kept in a stopped state.

The illumination device 40 is a device configured to irradiate the transparent body 1 as the inspection object with predetermined light and is placed at such a position that the transparent body 1 is placed between the imaging unit 50

Figure 3:
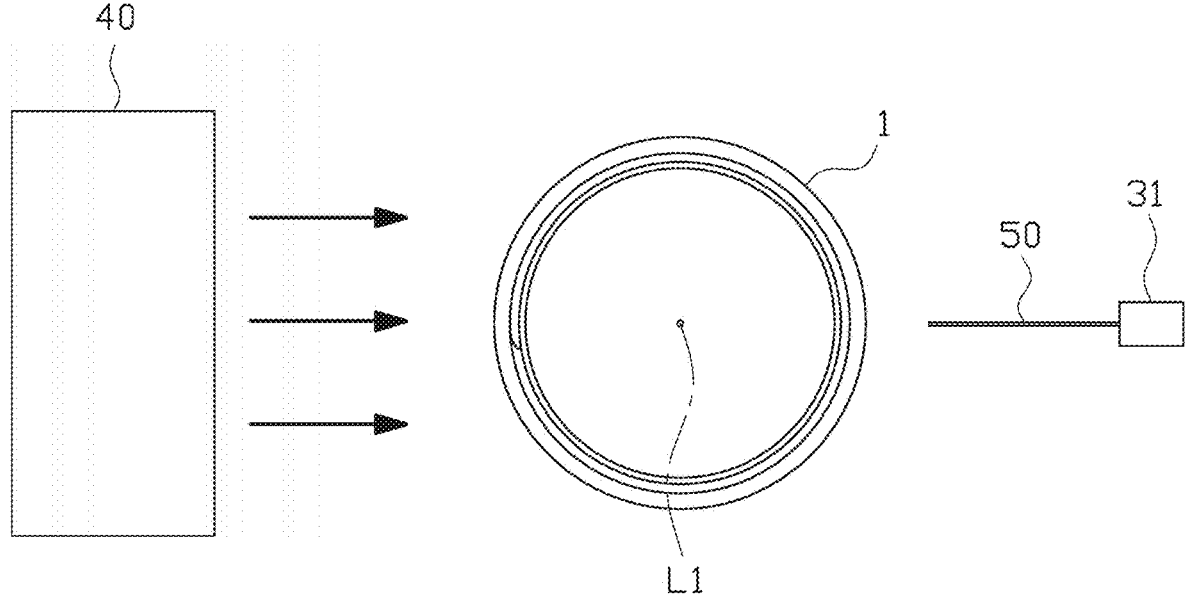
FIG. 3 is a schematic plan view illustrating the inspection device.

6 and the illumination device 40 in planar view (as shown in FIG. 1 and FIG. 3). According to one or more embodiments, the illumination device 40 includes a surface emitting light source and irradiates the transparent body 1 with diffused light. This configuration causes the diffused light transmitted through the transparent body 1 to reach the imaging unit 50.

Figure 4:
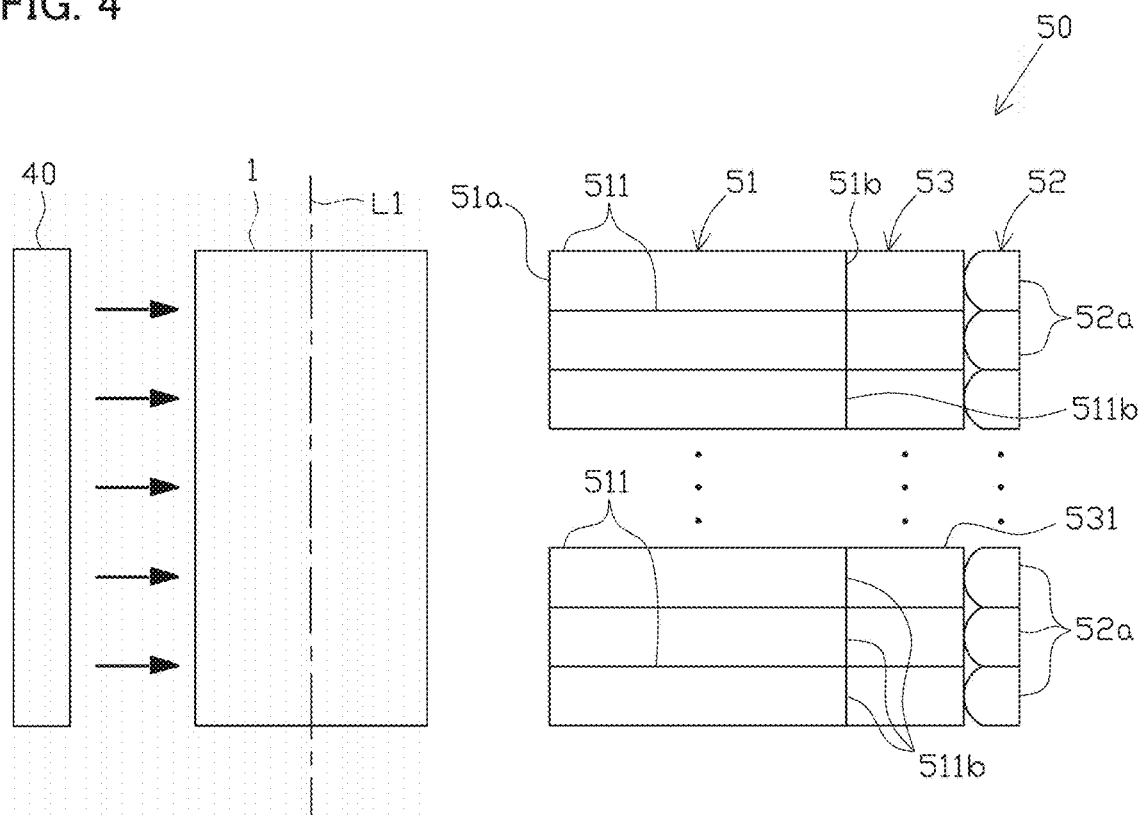
FIG. 4 is a schematic view illustrating an imaging unit and others.

The imaging unit 50 serves to obtain an image that is used for inspection of the transparent body 1. As shown in FIG. 4, the imaging unit 50 includes the FOP 51, a line sensor camera 52, and an oblique ray attenuation body 53. According to one or more embodiments, the line sensor camera 52 configures the "imaging unit", and the oblique ray attenuation body 53 configures the "oblique ray attenuation unit".

Figure 5:
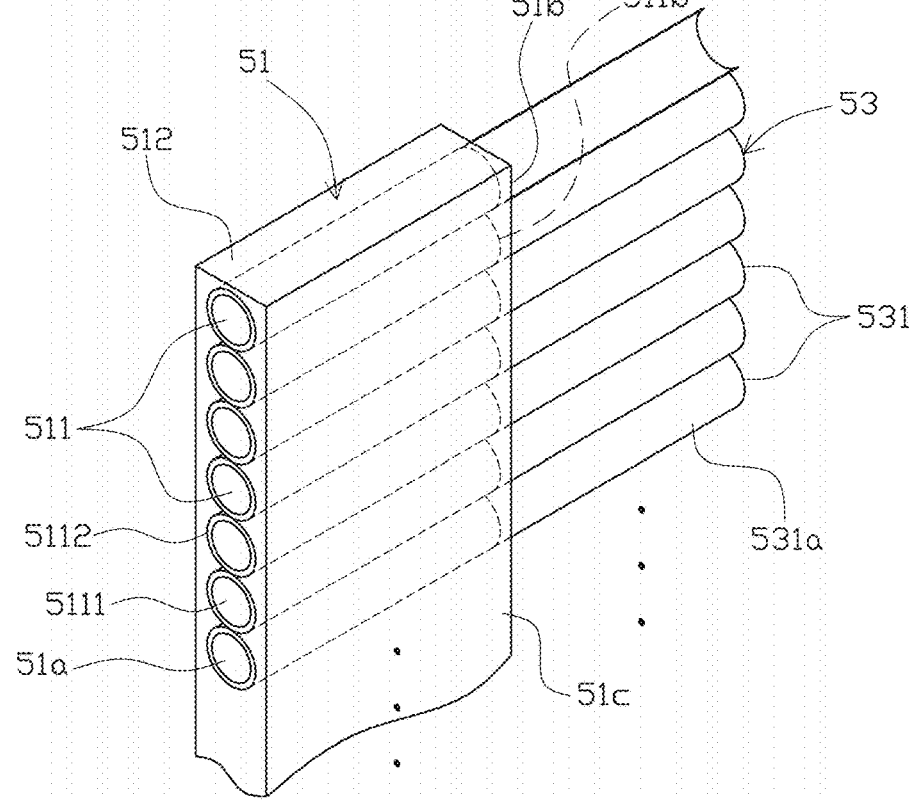
FIG. 5 is a schematic perspective view illustrating the configuration of a fiber optical plate and others.

As shown in FIG. 4 and FIG. 5, the FOP 51 includes a plurality of optical fibers 511 and a glass body 512 placed around the respective optical fibers 511. Each of the optical fibers 511 includes a core 5111 that is made of core glass and that is configured to transmit light rays, and a plurality of clads 5112 that are configured to cover an outer peripheral part of the core 5111. The clads 5112 are made of clad glass that has a lower refractive index than that of the core glass, so that the light rays entering the core 5111 are totally reflexed from a boundary surface between the core 5111 and the clads 5112. This configuration enables the light rays to be propagated from one end to the other end of the core 5111.

The respective optical fibers 511 are linearly extended to be arranged parallel to one another and to be arrayed in parallel along the rotation axis L1. The FOP 51 according to one or more embodiments has a thin plate-like shape (a sheet-like shape). According to one or more embodiments, the respective optical fibers 511 are arranged adjacent to one another. The respective optical fibers 511 may, however, be arranged to be slightly separate from one another.

Figure 6:
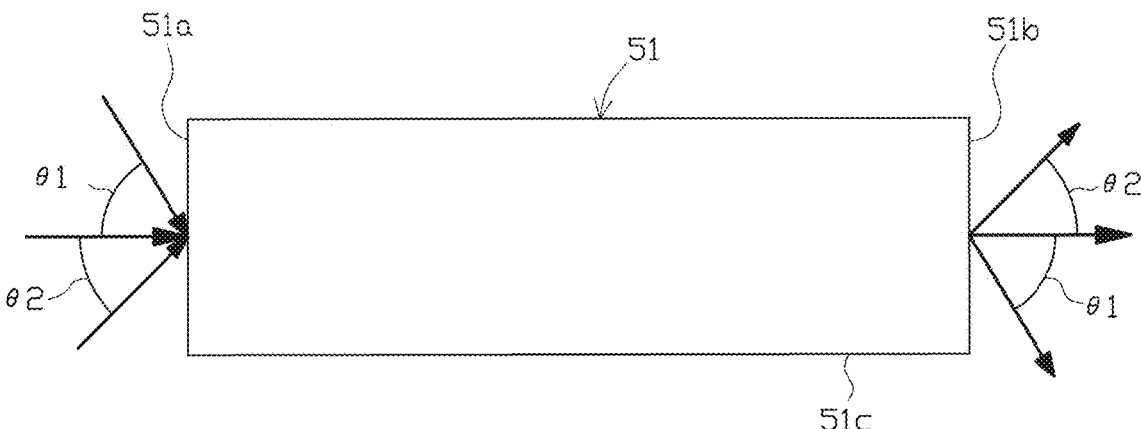
FIG. 6 is a schematic view illustrating a light incident surface, a light emission surface and a side face of the fiber optical plate.

As shown in FIGS. 4 to 6, the FOP 51 has the light incident surface 51*a* that faces the transparent body 1 as the inspection object, a light emission surface 51*b* that is located on the other side (on an opposite side) to the light incident surface 51*a*, and a flat plane-like side face 51*c* that is located between the light incident surface 51*a* and the light emission surface 51*b*. The respective optical fibers 511 are linearly extended in the direction perpendicular to the rotation axis L1 from the light incident surface 51*a* toward the light emission surface 51*b*. The FOP 51 enables the light rays passing through inside of the respective optical fibers 511 (the cores 5111) and entering the light incident surface 51*a* to be transmitted to the light emission surface 51*b*.

The light incident surface 51*a* and the light emission surface 51*b* are parallel to each other and form flat surfaces orthogonal to the side face 51*c*. This configuration causes the light rays entering the light incident surface 51*a* to be emitted from the light emission surface 51*b* at an emission angle that is equal to an incident angle. For example, the light rays entering the light incident surface 51*a* at incident angles θ1 and θ2 are emitted from the light emission surface 51*b* at emission angles θ1 and θ2.

Furthermore, the light emission surface 51*b* is provided with a plurality of outlets 511*b* of the optical fibers 511 for the light rays (the number of the outlets 511*b* is identical with the number of the optical fibers 511) (as shown in FIG. 4 and FIG. 5).

The line sensor camera 52 serves to take an image of the transparent body 1 as the inspection object. The line sensor camera 52 includes a plurality of sensor elements 52*a* (for example, photodiodes or the like) that are configured to receive the light rays transmitted through the FOP 51. The respective sensor elements 52*a* are aligned along the direction of the rotation axis L1 and are configured such that one sensor element 52a corresponds to one outlet 511b. Accordingly, each of the sensor elements 52a is allowed to receive the light rays passing through corresponding one optical fiber 511 (corresponding one core 5111). The respective sensor elements 52a receive the light rays transmitted through the FOP 51. This achieves imaging of the transparent body 1 as the inspection object. The image (image data) obtained by imaging is output to the control device 60.

Figure 7:
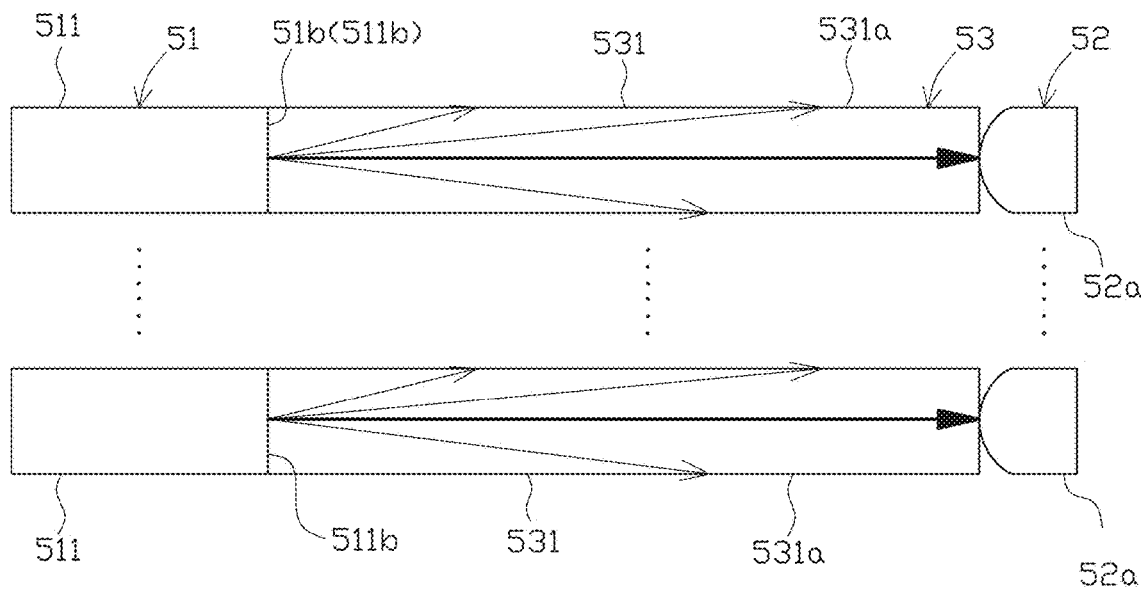
FIG. 7 is a schematic view illustrating an oblique ray attenuation body.

The oblique ray attenuation body 53 serves to attenuate oblique rays that are inclined with respect to an extending direction of attenuation function elements 531 described below, out of the light rays emitted from the light emission surface 51b. The oblique ray attenuation body 53 is located between the light emission surface 51b of the FOP 51 and the line sensor camera 52 and is placed such that one end side of the oblique ray attenuation body 53 is adjacent to the light emission surface 51b and the other end side thereof is adjacent to the line sensor camera 52. As shown in FIG. 5 and FIG. 7, the oblique ray attenuation body 53 includes a plurality of attenuation function elements 531, each of which is provided corresponding to each optical path between one outlet 511b and one sensor element 52a corresponding to the outlet 511b.

Each of the attenuation function elements 531 is in a straight cylindrical shape having a side wall 531a formed to surround each optical path between one outlet 511a and one sensor element 52a corresponding to the outlet 511b. An inner surface (a surface on an optical path-side) of the side wall 531a is a black rough surface. The inner surface of the side wall 531a is configured to absorb the oblique rays. This configuration attenuates the oblique rays out of the light rays emitted from each one outlet 511b and, as a result, causes only the light rays perpendicular to the light incident surface 51a and the light emission surface 51b to readily reach each sensor element 52a.

Referring back to FIG. 1, the control device 60 comprises a central processing unit (CPU), random-access memory (RAM), and read-only memory (ROM), and controls the motor 22, the illumination device 40 and the like described above and executes a variety of arithmetic operations, based on the image (image data) taken by the line sensor camera 52. The control device 60 includes a camera controller 61, an image data storage unit 62, and an image processor 63. The camera controller 61 and/or the image processor 63 may comprise a central processing unit (CPU) and/or may be controlled by the CPU of the control device 60. According to one or more embodiments, the image processor 63 configures the "determination unit".

The camera controller 61 serves to control the imaging timing of the transparent body 1 by the line sensor camera 52. This timing is controlled, in response to a signal from a non-illustrated encoder provided in the rotating table 21, the motor 22 or the like. Imaging by the line sensor camera 52 is performed every time the transparent body 1 is rotated by a predetermined angle.

The image data storage unit 62 serves to sequentially store image data taken by the line sensor camera 52 in time series. This obtains an image (image data) of the transparent body 1 including at least the entirety of the printed portion 2.

The image processor 63 executes a predetermined arithmetic operation and a determination process, based on the images (image data) that are obtained by the line sensor camera 52 and that are stored in the image data storage unit 62, so as to perform good/poor quality judgment with regard to the conditions of the transparent body 1 and the printing conditions of the printed portion 2. For example, the image processor 63 executes a binarization process of the images (image data) to obtain a binarized image, calculates the area and the length of a "black (0)" section in the binarized image, and compares the calculated area and the calculated length with predetermined reference values, so as to perform the good/poor quality judgment with regard to the conditions of the transparent body 1 and the printing conditions of the printed portion 2. In another example, the image processor 63 compares the obtained image with a previously-acquired image including a normal printed portion 2 and performs the good/poor quality judgment with regard to the printed portion 2, according to the matching degree of these images. The method of the good/poor quality judgment is appropriately modifiable.

The following describes an inspection procedure of the transparent body 1 using the inspection device 10 configured as described above.

In the process of inspection, first of all, the transparent body 1 as the inspection object is placed on the rotating table 21. At this moment, the rotation axis L1 of the rotating table 21 is to be adjusted to (to be aligned with) the center axis of the transparent body 1. The distance between the imaging unit 50 (more specifically, the light incident surface 51a of the FOP 51) and the transparent body 1 is adjusted by the distance adjustment mechanism 30, such as to cause a side wall portion of the transparent body 1 to be located in an in-focus range R of the imaging unit 50 (the line sensor camera 52) (as shown in FIG. 1). There may, however, be a sufficiently large clearance between the light incident surface 51a of the imaging unit 50 (the FOP 51) and the side wall portion of the transparent body 1. This is because the presence of the oblique ray attenuation body 53 provides a relatively large area of the range R (i.e., depth of field). This enables a focused image to be obtained without making the transparent body 1 excessively close to the imaging unit 50 (the FOP 51) or without bringing the transparent body 1 into contact with the imaging unit 50 (the FOP 51).

The illumination device 40 is subsequently turned on by the control device 60. This irradiates the transparent body 1 with the diffused light from the illumination device 40 and causes the light rays transmitted through the transparent body 1 to enter the light incident surface 51a of the FOP 51. The light rays entering the light incident surface 51a pass through the respective optical fibers 511 and the respective attenuation function elements 531 and are transmitted toward the line sensor camera 52-side. While the light rays pass through the attenuation function elements 531, the oblique rays out of the light rays entering the light incident surface 51a are attenuated.

The motor 22 is operated by the control device 60 during an interval of imaging operations by the line sensor camera 52, so that the transparent body 1 is rotated by each predetermined angle by the rotation mechanism 20. An image (image data) with regard to the whole circumference of the side wall portion of the transparent body 1 including the printed portion 2 is obtained by subsequently performing imaging of the transparent body 1 repeatedly by the line sensor camera 52 every time the transparent body 1 is rotated. The image (image data) obtained by such imaging is sent to the control device 60 and is stored into the image data storage unit 62.

Furthermore, the image processor 63 performs the good/poor quality judgment with regard to the conditions of the transparent body 1 (for example, the presence or the absence of any flaw or cracking) and the printing conditions of the printed portion 2 (for example, the presence or the absence of any missing, blurring, bleeding, and the like and the printing positions), based on the image obtained by the line sensor camera 52. When there is no defect in the whole circumference of the side wall portion of the transparent body 1 including the printed portion 2, the transparent body 1 is determined as non-defective. When there is any defect in at least part of the side wall portion of the transparent body 1, on the other hand, the transparent body 1 is determined as defective.

The good/poor quality judgment may be performed based on an obtained image, at the stage when an image with regard to part of the side wall portion of the transparent body 1 is obtained by the line sensor camera 52. This means that the good/poor quality judgment may be performed based on an obtained image, after an image with regard to the whole circumference of the side wall portion of the transparent body 1 is obtained or every time an image with regard to part of the side wall portion of the transparent body 1 is obtained.

As described above in detail, according to one or more embodiments, the attenuation function elements 531 of the oblique ray attenuation body 53 serve to attenuate the oblique rays that are inclined with respect to the extending direction of the attenuation function elements 531, out of the light rays emitted from the light emission surface 51*b* of the FOP 51. This configuration enables only the light rays entering from a specific direction to readily reach the sensor elements 52*a*, even in a state that a clearance is made between the transparent body 1 as the inspection object and the FOP 51, such as to allow the light rays from the transparent body 1-side to readily enter from a variety of directions to the light incident surface of the FOP 51. This prevents a reduction in the depth of field caused by the effects of the oblique rays and extends the depth of field. This configuration thus enables a focused image to be obtained more reliably even in the case of imaging the transparent body 1 in the state that a clearance is made between the transparent body 1 and the FOP 51. There is accordingly no need to separate the transparent body 1 and the FOP 51 from each other and make the transparent body 1 and the FOP 51 close to each other again, in the process of rotating and imaging the transparent body 1. The configuration thus allows for rotation and imaging of the transparent body 1 in the state that the transparent body 1 and the FOP 51 are kept separate from each other. This increases the speed of the inspection with assuring the high accuracy of the inspection.

Furthermore, the configuration of one or more embodiments enables a clearance to be made between the transparent body 1 as the inspection object and the FOP 51, so that there is no need that the surface of the FOP 51 (the light incident surface 51*a*) located on the transparent body 1-side has a shape that roughly matches with the shape of the side wall portion of the transparent body 1. There is accordingly no need to provide a plurality of different FOPs 51 for respective different transparent bodies 1 as the inspection objects or to replace the FOP 51 with a change of the inspection object. This reduces the cost required for the inspection.

Additionally, the light incident surface 51*a* and the light emission surface 51*b* are respectively the flat surfaces that are respectively orthogonal to the side face 51*c*, so that the emission angles of the light rays emitted from the light emission surface 51*b* can be made identical with the incident angles of the light rays entering the light incident surface 51*a*. This configuration enables the light rays that are transmitted through a location of the transparent body 1 located in front of the light incident surface 51, that orthogonally enter the light incident surface 51, and that are emitted from the light emission surface 51*b* in a direction perpendicular to the light emission surface 51*b*, to readily reach the sensor elements 52*a*. This configuration, on the other hand, makes it difficult for the light rays obliquely entering the light incident surface 51*a* (i.e., the oblique rays) to reach the sensor elements 52*a*. This enables an image of the transparent body 1 suitable for the inspection to be obtained more reliably and further enhances the inspection accuracy.

Moreover, the distance adjustment mechanism 30 facilitates handling of a variety of transparent bodies 1 having different shapes and enhances the convenience of the inspection.

The present disclosure is not limited to the description of the above embodiments but may be implemented, for example, by configurations described below. The present disclosure may also be implemented by applications and modifications other than those illustrated below.

Figure 8:
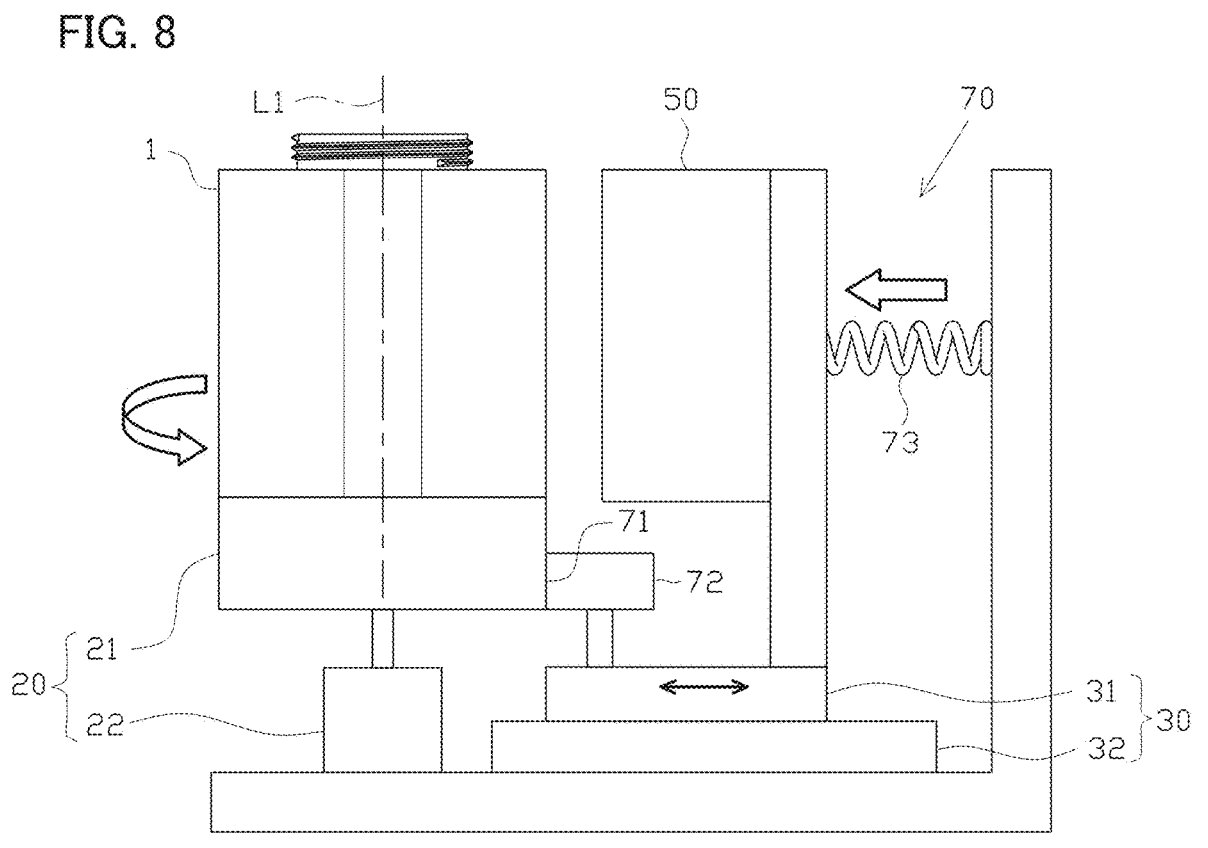

(a) As shown in FIG. 8, a distance keeping mechanism 70 serving as the "distance keeping unit" may be provided to keep constant a distance between at least a location of the transparent body 1 as an imaging object of the line sensor camera 52 and the imaging unit 50 (more specifically, the light incident surface 51*a* of the FOP 51) by moving the imaging unit 50 (the FOP 51) accompanied with rotation of the transparent body 1 by the rotation mechanism 20.

In the illustrated example of FIG. 8, the distance keeping mechanism 70 includes an identical shape component 71 that is provided on a side face of the rotating table 21; a rotatable rotary roller 72 that is fixed to the imaging unit 50 directly or indirectly (in this illustrated example, fixed to the holding base 31 configured to hold the imaging unit 50); a biasing component 73 (for example, a spring or a magnet) configured to apply a biasing force toward the identical shape component 71 to the rotary roller 72; and the distance adjustment mechanism 30. The identical shape component 71 has a cross section orthogonal to the rotation axis L1 that is in a substantially identical shape with the shape of an outer circumferential surface (contour line) in a cross section of the transparent body 1 orthogonal to the center axis of the transparent body 1. An outer circumferential surface of the rotary roller 72 is in pressure contact with the identical shape component 71 by the biasing force applied from the biasing component 73.

Figure 9:
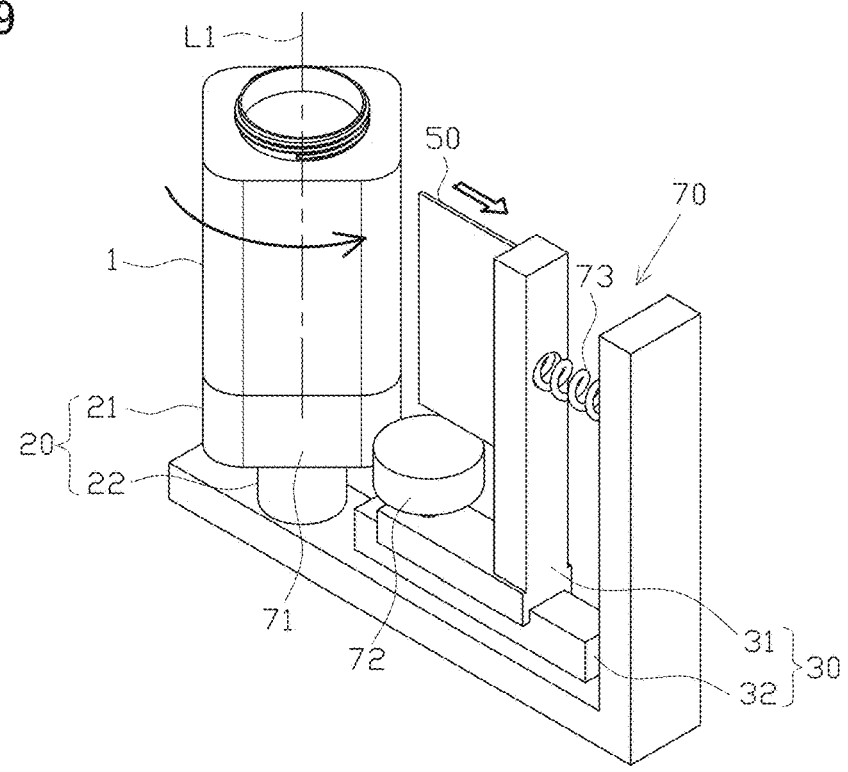
FIG. 9 is a schematic perspective view illustrating the move of the imaging unit in conjunction with the rotation of the transparent body according to one or more embodiments.
Figure 10:
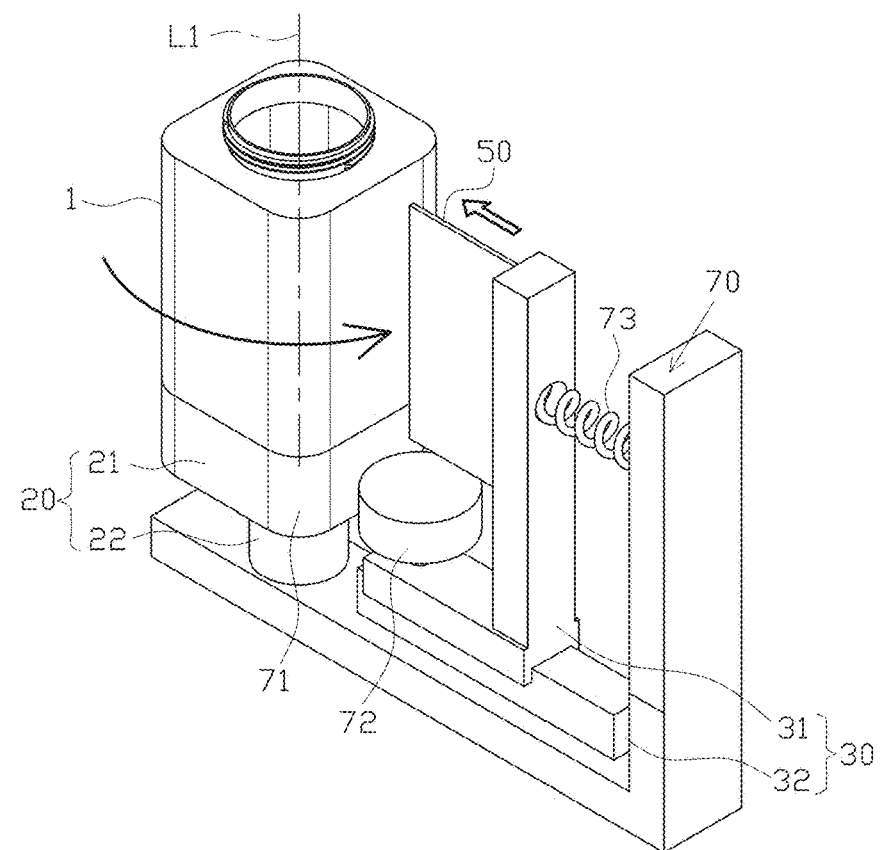
FIG. 10 is a schematic perspective view illustrating the move of the imaging unit in conjunction with the rotation of the transparent body according to one or more embodiments.

Providing this distance keeping mechanism 70 causes the imaging unit 50 to be moved with rotation of the transparent body 1, such as to keep constant the distance between the imaging object of the transparent body 1 and the imaging unit 50 (more specifically, the light incident surface 51*a* of the FOP 51) even when the transparent body 1 has a cross section in a non-circular shape as shown in FIG. 9 and FIG. 10. Accordingly, this configuration enables a focused image to be obtained more reliably even when the transparent body 1 as the inspection object has a variety of different shapes. This assures the more appropriate inspection (with the higher inspection accuracy) for the transparent bodies 1 having a variety of different shapes.

The distance keeping mechanism 70 is especially effective when an outer circumferential surface (contour line) of at least a location as an imaging object of the transparent body 1 has a cross section in a non-circular shape (for example, a cross section in an elliptical shape, a cross section in a polygonal shape, or a cross section in a rectangular shape).

The distance keeping mechanism may be provided with a distance measuring sensor (for example, an ultrasonic sensor) configured to measure a distance from the imaging unit 50 to the side wall portion of the transparent body 1 and a moving mechanism configured to automatically move the imaging unit 50 such that a distance between the FOP 51 and at least a location of the transparent body 1 as the imaging object by the line sensor camera 52 is kept constant, based on the distance measured by the distance measuring sensor. In this case, there is no need to provide the identical shape component 71 having the shape adjusted to the shape of the transparent body 1 as the inspection object. This accordingly suppresses an increase in the cost.

Figure 11:
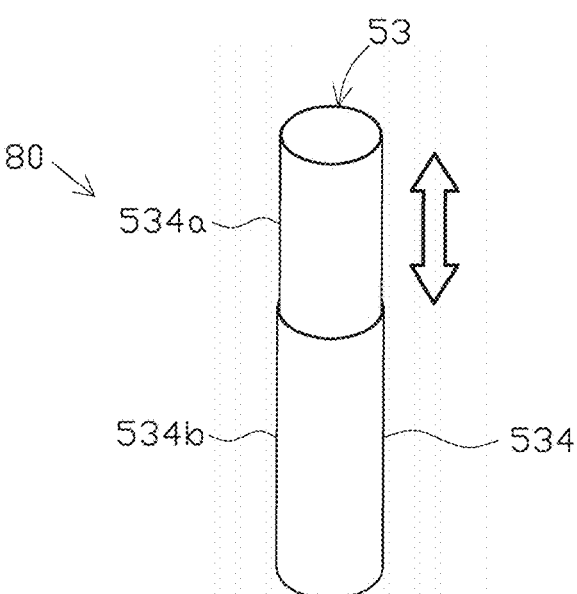
FIG. 11 is a schematic perspective view illustrating an attenuation function element having a telescopic cylindrical structure according to one or more embodiments.
Figure 12:
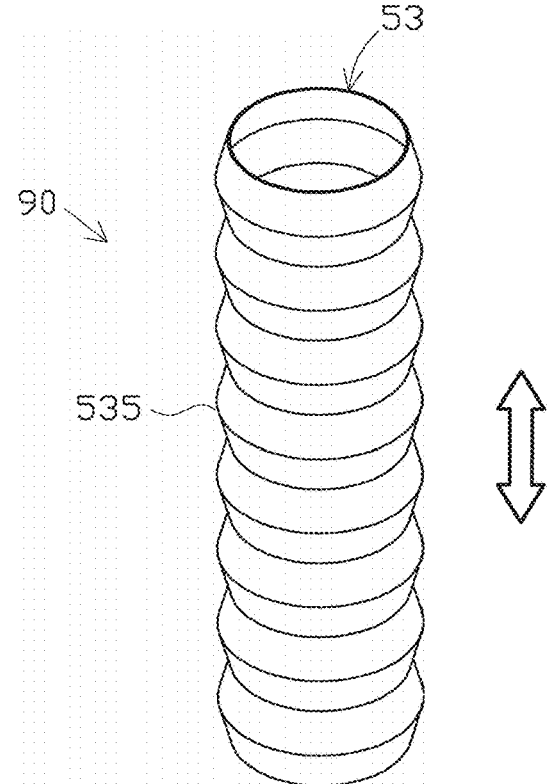
FIG. 12 is a schematic perspective view illustrating an attenuation function element having a bellows-like structure according to one or more embodiments.

(b) An attenuation regulator serving as the "attenuation regulating unit" may be provided to regulate the degree of attenuation of the oblique rays by the attenuation function elements 531. The attenuation regulator may be implemented by a function of making the attenuation function element extensible along a direction of an axis thereof (longitudinal direction). For example, as shown in FIG. 11, an attenuation function element 534 may be configured to have a telescopic cylindrical structure including a plurality of cylindrical portions 534a and 534b of different diameters. An attenuation regulator 80 may be implemented by a function of making the attenuation function element 534 extensible along a direction of an axis thereof (longitudinal direction) by this telescopic cylindrical structure. In another example, as shown in FIG. 12, an attenuation function element 535 may be configured to have a bellows-like structure. An attenuation regulator 90 may be implemented by a function of making the attenuation function element 535 extensible along a direction of an axis thereof (longitudinal direction) by this bellows-like structure.

The attenuation regulator 80 or 90 provided as described above serves to regulate the degree of attenuation of the oblique rays by the attenuation function element 534 or 535. The regulation of the degree of attenuation allows for adjustment of the depth of field. This configuration accordingly assures the appropriate inspection (with the high inspection accuracy) for the transparent body 1 having a variety of different shapes, for example, the transparent body 1 having a concave-convex surface or the transparent body 1 in a shape other than a cylindrical shape (for example, in an elliptic columnar shape or in a polygonal columnar shape).

According to a modification, the attenuation function element may be made of an elastic body such as a resin or a rubber, and the attenuation regulator may be implemented by making the attenuation function element extensible in a direction of an axis thereof.

(c) According to the embodiments described above, the illumination device 40 is placed at such a position that the transparent body 1 as the inspection object is placed between the illumination device 40 and the imaging unit 50, and is configured to cause the light transmitted through the transparent body 1 to reach the imaging unit 50. According to a modification, the illumination device 40 may be placed on the imaging unit 50-side and may be configured to cause the light reflected from the transparent body 1 to reach the imaging unit 50.

(d) Stamping may be made on the side wall portion of the transparent body 1 or a label or the like may be applied on the side wall portion. In this case, the inspection device 10 may be configured to perform the good/poor quality judgment with regard to the conditions or the position of the stamping or the label.

(e) The shape of the transparent body 1 as the inspection object is not limited to the shape described in the above embodiments. For example, the transparent body 1 having a concave-convex side wall portion may be the inspection object.

(f) According to the embodiments described above, the respective optical fibers 511 are configured to be linearly extended. The respective optical fibers 511 may, however, be bent or curved.

g) The inspection device 10 may be configured to perform an inspection for the inner surface of the side wall portion, as well as the outer surface of the side wall portion of the transparent body 1. For example, the inspection device 10 may be used to perform an inspection for a printed portion formed on the inner surface of the side wall portion.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 . . . transparent body (inspection object), 10 . . . inspection device, 20 . . . rotation mechanism (rotation unit), 30 . . . distance adjustment mechanism (distance adjustment unit), 40 . . . illumination device (illumination unit), 51 . . . fiber optical plate, 51a . . . light incident surface, 51b . . . light emission surface, 51c . . . side face, 52 . . . line sensor camera (imaging unit), 53 . . . oblique ray attenuation body (oblique ray attenuation unit), 63 . . . image processor (determination unit), 70 . . . distance keeping mechanism (distance keeping unit), 80, 90 . . . attenuation regulator (attenuation regulating unit), 511 . . . optical fiber, 511b . . . outlet, 531 . . . attenuation function element, L1 . . . rotation axis

What is claimed is:

1. An inspection device that inspects a transparent or translucent cylindrical body as an inspection object, the inspection device comprising:

an illumination device that irradiates the inspection object with predetermined light;

a rotation unit that rotates the inspection object about a predetermined rotation axis;

a fiber optical plate that:

holds a plurality of optical fibers arrayed in parallel along a direction of the rotation axis, and has a light incident surface facing the inspection object and a light emission surface opposite to the light incident surface, wherein light rays from the inspection object enter the light incident surface, pass through the optical fibers to reach the light emission surface, and are output from a plurality of outlets of the optical fibers disposed at the light emission surface, and the light incident surface and the light emission surface are flat surfaces orthogonal to a side face of the fiber optical plate located between the light incident surface and the light emission surface;

an imaging unit that:

comprises a plurality of sensor elements that are arranged in a row and respectively correspond to the outlets, and takes an image of the inspection object by receiving with the sensor elements the light rays transmitted through the fiber optical plate;

a control device that determines whether a quality of the inspection object is good or poor based on the image obtained by the imaging unit; and an oblique ray attenuation body that:

is disposed between the light emission surface and the imaging unit, and comprises a plurality of attenuation function elements arrayed in parallel and each surrounding an optical path between each of the outlets and each of the sensor elements corresponding to each of the outlets, wherein the attenuation function elements attenuate, out of the light rays output from the light emission surface, oblique rays that are inclined with respect to an extending direction of the attenuation function elements, and each of the attenuation function elements is:

composed of at least one of:

a bellows cylindrical body; and a telescopic cylindrical body including two or more cylindrical portions, and extendible between the outlets and the sensor elements to change an absorption area that absorbs the oblique rays and regulate a degree of attenuation of the oblique rays.

2. The inspection device according to claim 1, further comprising:

a distance adjustment unit that comprises a holding base and a rail, and moves at least one of the inspection object and the fiber optical plate, and adjusts a distance between the inspection object and the light incident surface of the fiber optical plate.

3. The inspection device according to claim 1, further comprising:

a distance keeping unit that keeps constant a distance between a part of the inspection object that is an imaging object by the imaging unit and the light incident surface of the fiber optical plate by moving at least one of the inspection object and the fiber optical plate with rotation of the inspection object by the rotation unit.

4. The inspection device according to claim 2, further comprising:

a distance keeping unit that keeps constant a distance between a part of the inspection object that is an imaging object by the imaging unit and the light incident surface of the fiber optical plate by moving at least one of the inspection object and the fiber optical plate with rotation of the inspection object by the rotation unit.

5. The inspection device according to claim 1, further comprising:

a distance keeping unit that keeps constant a distance between a location of the inspection object that is an imaging object by the imaging unit and the light incident surface of the fiber optical plate by moving at least one of the inspection object and the fiber optical plate with rotation of the inspection object by the rotation unit.

6. The inspection device according to claim 1, further comprising:

a distance keeping unit that keeps constant a distance between a location of the inspection object that is an imaging object by the imaging unit and the light incident surface of the fiber optical plate by moving at least one of the inspection object and the fiber optical plate with rotation of the inspection object by the rotation unit.

\* \* \* \* \*